March 18, 1941.  M. KATCHER  2,235,431
THRUST BALL BEARING
Filed June 6, 1940
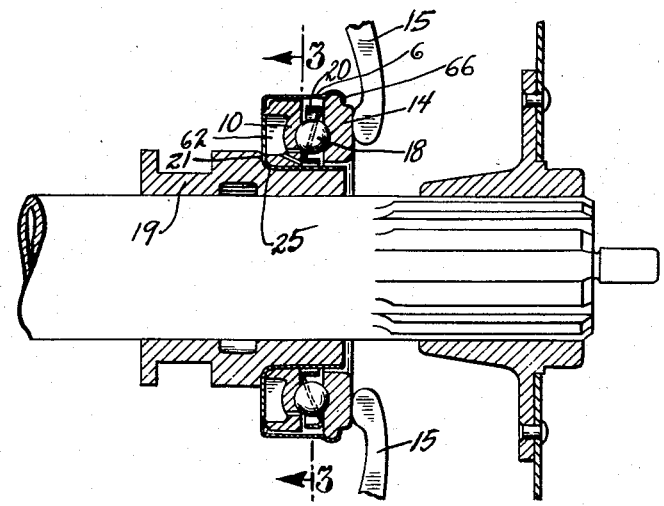
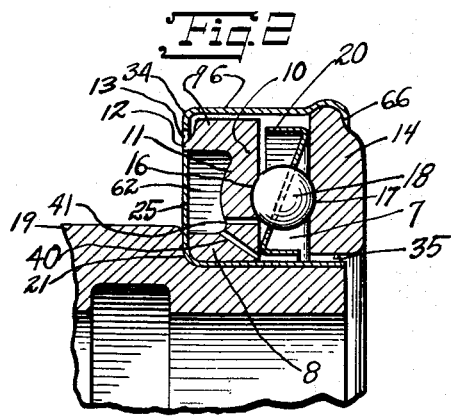
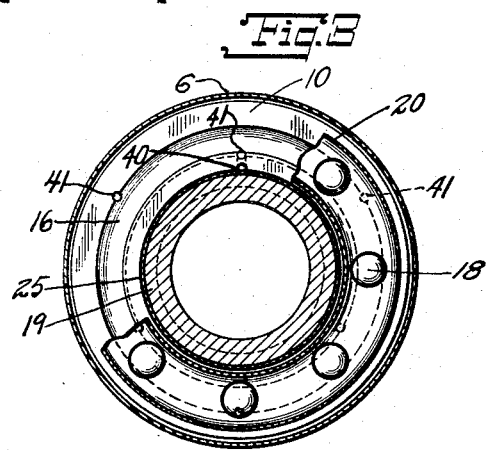
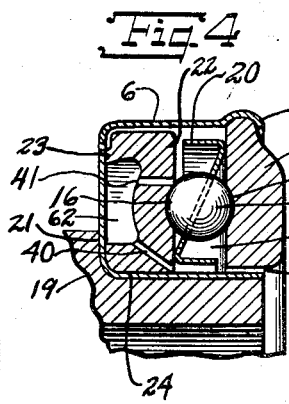
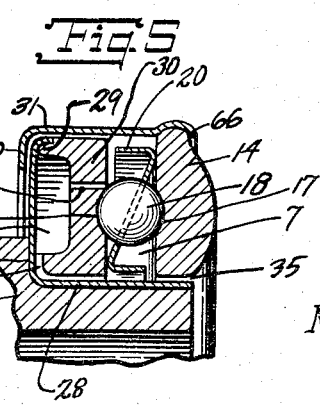
INVENTOR
*Morris Katcher*
BY
*Emanuel Scheyer*
ATTORNEY Patented Mar. 18, 1941

2,235,431

UNITED STATES PATENT OFFICE 2,235,431

THRUST BALL BEARING

Morris Katcher, New York, N. Y.

Application June 6, 1940, Serial No. 339,043

12 Claims. (Cl. 308—233)

This invention relates to ball bearings, and more particularly to those thrust bearings which are used as the clutch release bearing of an automobile. It is desirable in a ball thrust bearing to have efficient lubrication with a minimum escape of the lubricant, both to avoid the necessity of supplying additional lubricant to the bearing and to prevent the likelihood of the lubricant getting on the friction surfaces of the normally dry clutch. With my design the escape of lubricant is kept to a desired minimum, and by the provision of a reservoir in addition to the space between the raceways, enough lubricant can be put in the bearing to last for the life of the bearing. As is readily understood however, provision can be made for a grease fitting leading to the reservoir to replenish the lubricant if necessary but experience has shown that this is not required. The reservoir substantially protects the lubricant held within it from the atmosphere to prevent deterioration. Only enough lubricant is discharged at any time from the reservoir into the space between the race rings for efficient lubrication, the discharge being through passages of small cross section. Capillary passages may be used. The reservoir is situated in one of the race rings. A feed passage or passages lead from the reservoir through said race ring and discharge lubricant preferably into one of the ball grooves. In addition to the feed passages, the reservoir is connected to atmosphere by one or more small vent passages which permit the entrance of air into the reservoir as the grease leaves it. As the bearing heats with use, lubricant travels through the feed passage or passages to the balls.

This application shows modifications of bearings forming the subject matter of my copending applications Serial Nos. 300,913 and 329,772.

Other objects and advantages will become apparent upon further study of the description and drawing, in which:

Fig. 1 is a vertical longitudinal section of a typical automobile clutch release bearing modified to embody my invention.

Fig. 2 is a partial longitudinal section through the bearing to an enlarged scale showing one type of mounting of the fixed race ring at the reservoir.

Fig. 3 is a cross section taken along the line 3—3 of Fig. 1, the shaft being omitted.

Fig. 4 is a section taken similarly to Fig. 2 and shows a modified type of mounting of the fixed race ring, and Fig. 5 is a section taken similarly to Fig. 2 and shows still another modified type of mounting of the fixed race ring.

Fixed race ring 10, Figs. 1–3, has a drive fit at its inside diameter in the spun sheet metal inner jacket or shell 25, said ring engaging the inside face of the inner wall of said shell. Z-shaped retainer ring 20, with balls 18 in spaced openings in its web is set inside outer or free shell 6 and over shell 25 next to race ring 10. Alongside retainer ring 20 with its balls 18 in outer or free shell 6 and over shell 25 is mounted free race ring 14. Shell 6 is fixed to free race ring 14 by having its flange 66 spun tightly over the outside of said latter race ring.

Retainer ring 20 with its balls 18 is free to rotate in the space 7 between race rings 10 and 14, the conventional ball race grooves 16 and 17 respectively being provided in the race rings. Race ring 14 has a running fit over shell 25. Fixed race ring 10 is substantially channel-shaped in cross section so as to provide a reservoir 62 in the space formed by the legs 8 and 9 of the channel and its web 11. The radially extending wall of shell 25 forms the back wall of the reservoir. Radially outer leg 9 has a lip 12 which engages the outer edge of the radial wall of shell 25 with a tight fit. A slight clearance 13 is provided between the outside of lip 12 and the radially inturned flange 34 of free shell 6. The rear of radially inner leg 8 has a tight fit with the inside of shell 25. Flange 34 prevents separation of shell 6 and ring 14 from the rest of the bearing. Reservoir 62 is packed with grease, and as will be seen, is a place from which the grease is sent out when the bearing is heated and to which it returns to a certain extent when the bearing cools.

An air vent 40 is provided between reservoir 62 and space 7 in the form of a passage of small cross section extending through leg 8 to the inside of the cylindrical wall of shell 25. Also feed passages 41 of small cross section extend through leg 8 from reservoir 62 to space 7 at the sides of ball groove 16. Air vent 40 is located radially inward from passages 41, assisting in making the vent function. Clearance 35 between ring 14 and shell 25 lets vent 40 communicate with the atmosphere. As the bearing rotates, centrifugal action tends to force the grease radially outward, so that a passage with its end at space 7 located sufficiently inward radially will tend to be free from grease and suck in air.

Shell 25 with the rings 10, 14 and 20, balls 18 and outer or free shell 6 assembled upon it is given a drive or tight fit on floating or sliding hub 19, the shell 25 abutting a shoulder 21 on the hub. The sliding hub, it will be understood, is reciprocated by the conventional clutch pedal. The forward face of free race ring 14 is contacted by a plurality of radially arranged clutch release levers or fingers 15.

It is believed the action is as follows: As the bearing warms up, the grease expands and the surplus in reservoir 62 squeezes through passages 41 into space 7. Upon cooling, the grease contracts and air is sucked in from the outside through air vent 40. The next time the bearing goes into action and its temperature is raised, the grease expands again which together with the expansion of the air previously sucked in, forces a certain amount of grease again into the race. Also the melting of the grease would cause some of it to run out of the passages. This action continues with the alternate heating and cooling of the bearing. Provision could be made for a grease fitting to replenish the lubricant in the reservoir as it gives out. Experience, however, has shown that this is unnecessary, with the proper proportioning of reservoir 62 and its passages.

In Fig. 4 is shown a modified form of my bearing in which fixed race 22 has its lip 23 pressed against the inside of the radial wall of fixed inner shell 24. Feed passages 26 lead from reservoir 27 to ball groove 16 in space 7 between the rings. Vent passage 40 is provided as in Fig. 2. The rest of the parts which are similarly numbered are the same as in Fig. 2. Race ring 22 has a forced fit in shell 24 and the latter has a tight fit on sliding hub 19.

In the modification shown in Fig. 5, inner fixed shell 28 has the outer end of its radial wall peened or spun over lip 29 of fixed race ring 30. Outer free shell 31 has its forward end at flange 66 spun over the outer edge of free race ring 14. The rear end of shell 31 is spun radially inward at 70 to overlap at the rear the radial wall of shell 28. Vent passage 32 leads from reservoir 33 along the radially inward face of ring 30 to space 7 between the race rings. The rest of the parts which are similarly numbered are the same as in Fig. 4. Race ring 30 has a forced fit in shell 28 and the latter has a tight fit on sliding hub 19.

The terms denoting to the rear and forward or to the front are used in a relative sense in the description and the claims.

I claim:

1. A thrust ball bearing comprising an annular inner shell having an axially extending inner wall, and a substantially radially extending rear wall, an annular outer shell having a substantially axially extending wall, a fixed race ring at the rear of the inner shell having a tight fit with said inner and rear walls, said ring being formed to leave a space between its rear face and the forward face of said rear wall for providing a lubricant reservoir, a free race ring loosely mounted near the forward portion of the inner shell, and balls extending between the race rings holding them in spaced relation, the fixed race ring being provided with at least one passage leading from the reservoir to the space between the race rings, said outer shell being fixed substantially at its forward end to the free race ring and extending rearwardly across the space between the race rings, and said inner shell extending from the fixed race ring forwardly across the space between the rings.

2. A thrust ball bearing comprising an annular inner shell having an axially extending inner wall and a substantially radially extending rear wall, an annular outer shell having an axially extending wall, a fixed race ring at the rear of the inner shell having a tight fit with the inside face of said inner wall, the outer portion of the fixed race ring overlapping and engaging the outer edge of the radially extending rear wall, said ring being formed to leave a space between its rear face and the forward face of said rear wall for providing a lubricant reservoir, a free race ring loosely mounted near the forward portion of the inner shell, and balls extending between the race rings holding them in spaced relation, the fixed race ring being provided with at least one passage leading from the reservoir to the space between the race rings, said outer shell being fixed substantially at its forward end to the free race ring and extending rearwardly across the space between the race rings.

3. A thrust ball bearing comprising an annular inner shell having an axially extending inner wall and a substantially radially extending rear wall, an annular outer shell having an axially extending wall, a fixed race ring at the rear of the inner shell having a tight fit with the inside face of said inner wall, the outer portion of the fixed race ring being in tight abutment with the forward face of said rear wall, said ring being formed to leave a space between its rear face and the forward face of said rear wall for providing a lubricant reservoir, a free race ring loosely mounted near the forward portion of the inner shell, and balls extending between the race rings holding them in spaced relation, the fixed race ring being provided with at least one passage leading from the reservoir to the space between the race rings, said outer shell being fixed substantially at its forward end to the free race ring and extending rearwardly across the space between the race rings.

4. A thrust ball bearing comprising an annular inner shell having an axially extending inner wall and a substantially radially extending rear wall, an annular outer shell having an axially extending wall, a fixed race ring at the rear of the inner shell having a tight fit with the inside face of said inner wall, the outer portion of the rear wall being bent over forwardly to engage tightly the fixed race ring, said ring being formed to leave a space between its rear face and the forward face of said rear wall for providing a lubricant reservoir, a free race ring loosely mounted near the forward portion of the inner shell, and balls extending between the race rings holding them in spaced relation, the fixed race ring being provided with at least one passage leading from the reservoir to the space between the race rings, said outer shell being fixed substantially at its forward end to the free race ring and extending rearwardly across the space between the race rings.

5. A thrust ball bearing comprising an annular inner shell having an axially extending inner wall, an annular outer shell having an axially extending wall, a fixed race ring substantially at the rear of the inner shell having a tight fit therewith, a free race ring loosely mounted near the forward portion of the inner shell, and balls extending between the race rings holding them in spaced relation, said inner shell having also a rear wall extending radially to overlap substantially the rear of the fixed race ring cooperating with the latter to provide a lubricant reservoir in communication with the space between the race rings, said outer shell being fixed substantially at its forward end to the free race ring and extending rearwardly across the space between the race rings.

6. A thrust ball bearing comprising an annular inner shell having an axially extending inner wall, an annular outer shell having an axially extending wall, a fixed race ring substantially at the rear of the inner shell having a tight fit therewith, a free race ring loosely mounted near the forward portion of the inner shell, and balls extending between the race rings holding them in spaced relation, said inner shell having also a rear wall extending radially to overlap substantially the rear of the fixed race ring cooperating with the latter to provide a lubricant reservoir in communication with the space between the race rings, said outer shell being fixed substantially at its forward end to the free race ring, extending rearwardly to the fixed race ring and relatively rotatable therewith, the rear portion of the outer shell extending radially from its axially extending wall to prevent the separation of the outer shell from the fixed race ring.

7. A thrust ball bearing comprising an annular inner shell having an axially extending wall, an annular outer shell having an axially extending wall, a fixed race ring substantially at the rear of the inner shell having a tight fit over the axially extending wall thereof, a free race ring loosely mounted near the forward portion of the inner shell, and balls extending between the race rings holding them in spaced relation, said outer shell being fixed at substantially its forward end to the free race ring extending rearwardly over the fixed race ring and radially inward to the rear of and radially overlapping said latter ring and relatively rotatable therewith, said radially extending portion of the outer shell limiting the forward motion of the free race ring, said inner shell having also a rear wall extending radially to overlap substantially the rear of the fixed race ring cooperating with the latter to provide a lubricant reservoir in communication with the space between the race rings, said inner shell extending from the fixed race ring forwardly across the space between the rings.

8. A thrust ball bearing comprising an annular inner shell having an axially extending inner wall and a substantially radially extending rear wall, an annular outer shell having an axially extending wall, a fixed race ring substantially at the rear of the inner shell having a tight fit therewith, a free race ring loosely mounted near the forward portion of the inner shell, and balls extending between the race rings holding them in spaced relation, said outer shell being fixed substantially at its forward end to the free race ring, extending rearwardly over the fixed race ring and said rear wall and radially inward to the rear of and radially overlapping said rear wall, said radially extending portion of the outer shell limiting the forward motion of the free race ring.

9. A thrust ball bearing comprising an annular inner shell having an axially extending inner wall and a substantially radially extending rear wall, an annular outer shell having a substantially axially extending wall, a fixed race ring at the rear of the inner shell having a tight fit with said inner and rear walls, said ring being formed to leave a space between its rear face and the forward face of said rear wall for providing a lubricant reservoir, a free race ring loosely mounted near the forward portion of the inner shell and balls extending between the race rings holding them in spaced relation, the fixed race ring being provided with at least one passage leading from the reservoir to the space between the race rings, a vent also being provided leading from the reservoir to the space between the race rings, said outer shell being fixed substantially at its forward end to the free race ring and extending rearwardly across the space between the race rings.

10. A thrust ball bearing as claimed in claim 9 in which the vent extends through the fixed race ring to the space between the race rings at the inner portion of the fixed race ring.

11. A thrust ball bearing as claimed in claim 9 in which the vent is provided by means of a groove in the fixed race ring at the lower portion thereof and adjacent the inside face of the inner shell, said groove leading from the reservoir to the space between the race rings at the inside face of said inner wall.

12. A thrust ball bearing comprising an annular inner shell having an axially extending inner wall and a substantially radially extending rear wall, an annular outer shell having a substantially axially extending wall, a fixed race ring at the rear of the inner shell having a tight fit with said inner and rear walls, said ring being formed to leave a space between its rear face and the forward face of said rear wall for providing a lubricant reservoir, a free race ring loosely mounted near the forward portion of the inner shell, and balls extending between the race rings holding them in spaced relation and riding in grooves provided in said rings, at least one passage being provided in the fixed race ring leading from the reservoir to the groove in the fixed race ring, said outer shell being fixed substantially at its forward end to the free race ring and extending rearwardly across the space between the race rings.

MORRIS KATCHER.